UNITED STATES PATENT OFFICE.

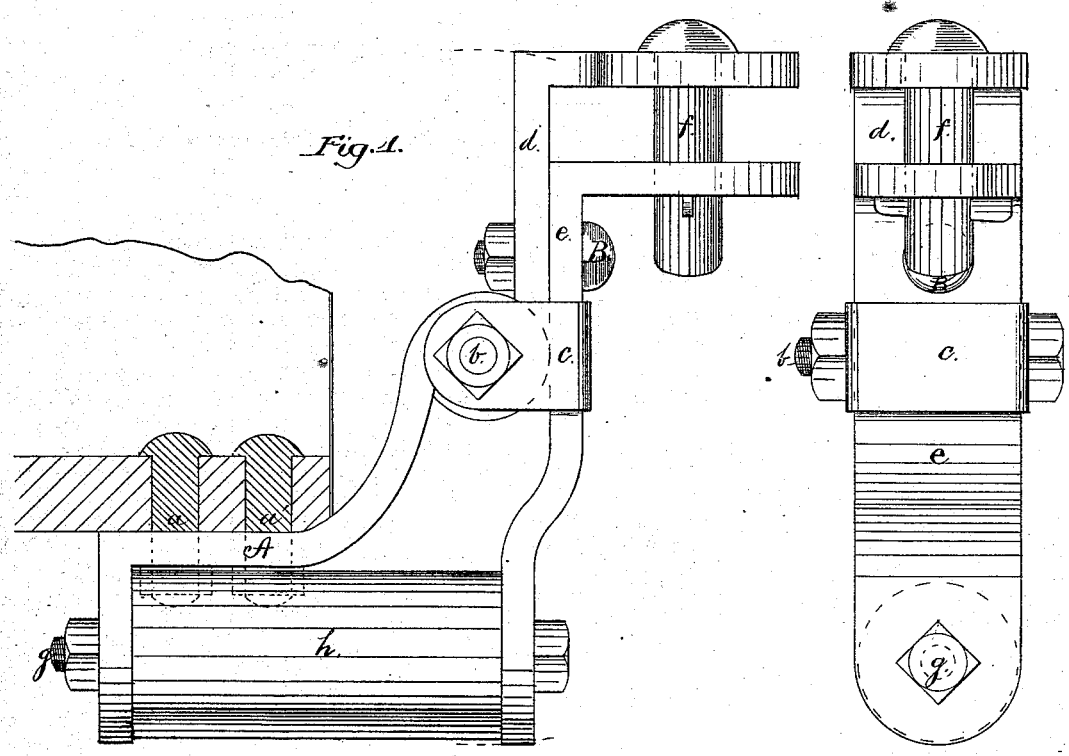

GOTTFRIED JACOBY, OF NEW ORLEANS, LOUISIANA, ASSIGNOR TO CANAL AND CLAIBORNE STREET RAILWAY COMPANY, OF SAME PLACE.

IMPROVEMENT IN DRAW-HEADS FOR STREET-CARS.

Specification forming part of Letters Patent No. 159,415, dated February 2, 1875; application filed December 22, 1874.

*To all whom it may concern:*

Be it known that I, GOTTFRIED JACOBY, a resident of the city of New Orleans and State of Louisiana, have invented a certain new and useful Improvement in Draw-Heads for Street-Railway Cars; and I do hereby declare the following to be a full, clear, and correct description of the same, reference being had to the annexed drawing making a part of this specification.

The object of my invention is to provide an elastic draw-head that will relieve draft animals of the sudden pull and jar, to which they are usually subjected in starting street-railway cars or other vehicles, and thereby prevent the injurious straining or other serious evils that are incident thereto.

The construction of my improved device will be better understood by referring to the accompanying drawing, in which—

Figure 1 is a side view, and Fig. 2 a front view, of the same.

A is a substantial frame of iron or other metal, which is secured to the front end of the platform of the car by means of bolts, as plainly shown at $a\ a'$. To the upper projecting end of this frame is secured, by means of the bolt $b$ and strap $c$, what I may term the vibrating portion of my device, which consists of the two metal pieces $d$ and $e$. The upper ends of these pieces project forward at right angles, with sufficient space between each to receive the whiffletree, which is held therein by the pin $f$. Through the lower projection of the fixed frame A and vibrating section $e$ is inserted a bolt, $g$, upon which is strung an elastic gum spring, $h$, which gently yields to any sudden pressure upon it, and hence prevents the draft animal from experiencing jars and strains upon the shoulders, thereby rendering his actions easier and more effective. B is a bolt, which passes through the vibrating sections of my device, and serves to bind the two more closely together.

It will be observed from the peculiar construction of my improved draw-head that the whiffletree is secured at a much higher point than is usual, thereby bringing the strain more squarely upon the shoulders of the animal, thus preventing, in a great measure, the abrasion of the skin under the hames and collar.

Having described my invention, what I claim as new, and desire to secure by Letters Patent, is—

The combination of the frame A, sections $d$ and $e$, and spring $h$, as and for the purpose set forth.

GOTTFRIED JACOBY.

Witnesses:
 JOS. H. DEGRANGE,
 F. BONE.